C. L. STOKES.

VACUUM LIQUID FEEDING APPARATUS AND METHOD THEREFOR.

APPLICATION FILED JUNE 6, 1919.

Reissued July 29, 1919.

14,701.

5 SHEETS—SHEET 1.

INVENTOR

Charles L. Stokes

BY

George C. Klein ATTORNEY

C. L. STOKES.

VACUUM LIQUID FEEDING APPARATUS AND METHOD THEREFOR.

APPLICATION FILED JUNE 6, 1919.

Reissued July 29, 1919.

14,701.

5 SHEETS—SHEET 2.

Charles L. Stokes INVENTOR

BY

George Olean ATTORNEY

C. L. STOKES.

VACUUM LIQUID FEEDING APPARATUS AND METHOD THEREFOR.

APPLICATION FILED JUNE 6, 1919.

Reissued July 29, 1919.

14,701.

5 SHEETS—SHEET 3.

Charles L. Stokes INVENTOR

BY

George H. Dean ATTORNEY

C. L. STOKES.

VACUUM LIQUID FEEDING APPARATUS AND METHOD THEREFOR.

APPLICATION FILED JUNE 6, 1919.

Reissued July 29, 1919.

14,701.

5 SHEETS—SHEET 4.

INVENTOR

Charles L. Stokes

BY

Geo. A. Kean ATTORNEY

C. L. STOKES.

VACUUM LIQUID FEEDING APPARATUS AND METHOD THEREFOR.

APPLICATION FILED JUNE 6, 1919.

Reissued July 29, 1919. 14,701.

5 SHEETS—SHEET 5.

INVENTOR

Charles L. Stokes

BY

George A. Olson ATTORNEY

UNITED STATES PATENT OFFICE.

CHARLES LAWRENCE STOKES, OF LOS ANGELES, CALIFORNIA.

VACUUM LIQUID-FEEDING APPARATUS AND METHOD THEREFOR.

14,701. Specification of Reissued Letters Patent. Reissued July 29, 1919.

Original No. 1,230,832, dated June 19, 1917, Serial No. 91,303, filed April 15, 1916. Application for reissue filed June 6, 1919. Serial No. 302,334.

*To all whom it may concern:*

Be it known that I, CHARLES LAWRENCE STOKES, a citizen of the United States, and a resident of Los Angeles, in the county of Los Angeles and State of California, formerly residing at Millong, via Young, New South Wales, Australia, have invented certain new and useful Improvements in Vacuum Liquid-Feeding Apparatus and Methods Therefor, of which the following is a specification.

This invention relates to apparatus in which partial vacuum created by the induction strokes of an internal combustion engine is utilized to raise gasolene or other liquid fuel or lubricating oil from a low level tank to a high level feed reservoir from which it is supplied to the carbureter or the oil distributing system as the case may be.

The invention includes a method whereby either the height to which the gasolene or other liquid may be sucked by the available vacuum may be very considerably increased or the minimum vacuum on which a given system will successfully pump, is considerably lowered. For sucking gasolene to the engine from the rear tank of an automobile, improvement in both the above particulars is desirable when the car is laboring up a relatively steep grade. The method involves restrictedly admitting air into the column of gasolene being lifted from the rear tank to the engine, thus lightening the weight of the column and at the same time carbureting the entrained air which is afterward utilized as part of the explosive charge in the engine.

The invention also includes certain improved apparatus capable of operating in accordance with said method.

The invention, both method and apparatus, is herein shown as embodied in a gasolene storage and pumping system wherein the gasolene and entrained air passing through the lift pipe are sucked into a high level reservoir whence any overplus of the liquid so raised is returned to the low level storage tank by gravity.

The broad invention does not require the use of automatic valves in the high level reservoir for the purpose of varying or breaking the vacuum or governing the movements of the liquid or air and although such valves may be used while retaining the essential features of the invention, they are not shown in the specific apparatus selected for illustration in the drawings.

The application of the invention to a lubricating oil system and to a fuel oil system are quite independent, the one of the other, but the apparatus is substantially the same whether employed for feeding gasolene to a carbureter or feeding of lubricating oil in a constant level splash lubricating system.

In the application of the invention for the feeding of oil fuel the high level feed reservoir may form part of the carbureter structure, in which case it takes the place of the usual float control fuel level device, or it may be fitted separately from a carbureter which contains such a feed control device, and in the latter case is usually mounted on the dash-board of an automobile or elsewhere above the level of the service required, and is preferably constructed in such a manner that the flow of fuel through it is observable.

The specific apparatus herein shown comprises means for admitting a limited quantity of air into the ascension branch of a loop pipe system connecting a low level tank and a high level feed reservoir, a vacuum connection from the upper part of said feed reservoir to the induction system of the engine, and a fuel service connection from the lower part of said reservoir to the carbureter.

It is in this apparatus necessary that the degree of vacuum in the high level feed reservoir shall be approximately equal to the degree of vacuum around the jet nozzle or equivalent fuel intake part in the carbureter, for if it be greater or less the carbureter would be either starved or flooded. A low degree of vacuum only is necessary for the operation of the loop circulating system, inasmuch as the ascending and descending columns in the loop balance, as they are approximately equal in height, and it is required only to apply a sufficient degree of suction to bring some air into the ascension pipe thereby to diminish the gravity of the column in said ascension pipe and so promote circulation upwardly through it.

It is immaterial whether the air be entrained by the flowing fuel or the fuel entrained by air passing through the ascension pipe. The operative condition is satisfied for insuring circulation through the loop if the ascension limb of the loop carries a proportion of air sufficient to disturb the hydrostatic balance otherwise existing and that thus a circulation of fuel is procured at a rate at least equal to the maximum demand of the engine. It has been established practically that a very small quantity of air under a low vacuum suffices for this purpose. The necessary degree of vacuum is obtainable in the locality of the jet nozzle in many standard types of carbureters, and in the case of carbureters of the type in which the main jet nozzle is not under partial vacuum while the motor is idling or running slow, a control may be readily fitted in the air inlet of the carbureter to establish a sufficiently high degree of partial vacuum around the jet and to procure an approximately equal degree of vacuum for the time being in the high level feed reservoir. Under these conditions, fuel will be supplied from the reservoir through the jet of the carbureter obediently to the velocity of the induction draft operating at the nozzle mouth, as is well known in carbureters in which the fuel level is maintained at or slightly below the mouth of the nozzle.

In the accompanying drawings, Figure 1 represents the apparatus, as it would be fitted to an automobile, with the high level feed reservoir associated directly with a carbureter, and dispensing with the necessity for a float control for the fuel feed to said carbureter;

Fig. $5^a$ is a detail section showing a variant form of check valve to be used in the arrangement described in connection with Fig. 5.

Figures 6, 7:
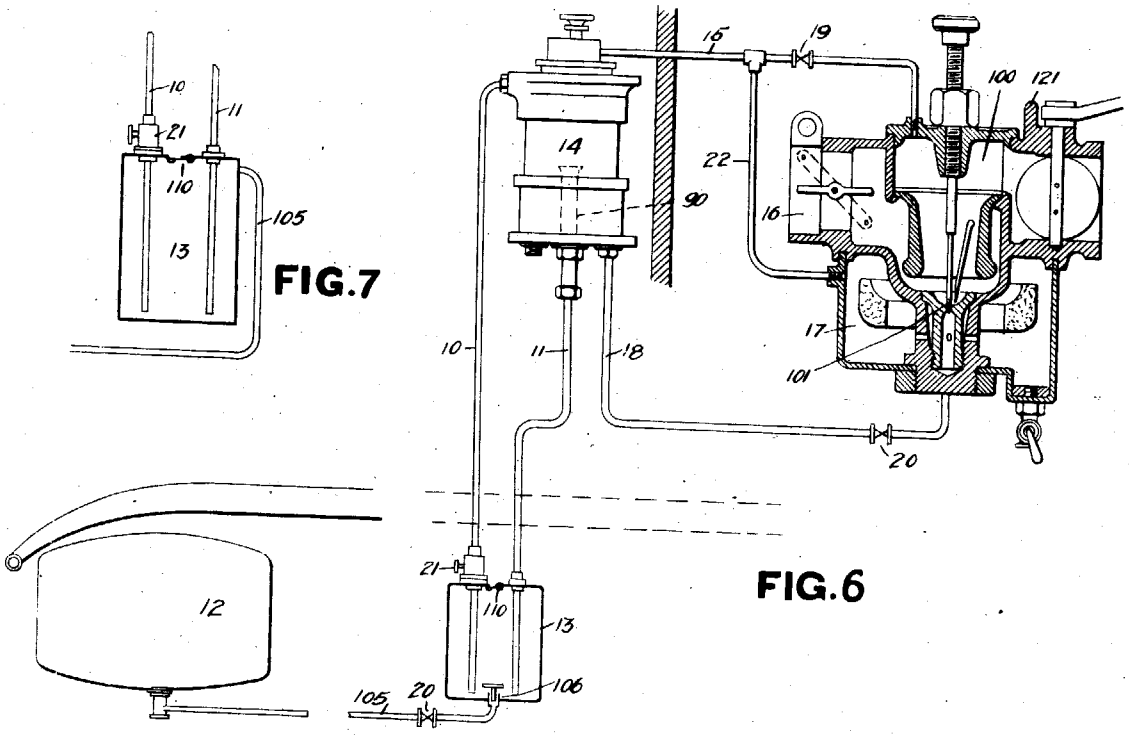
Figure 9:
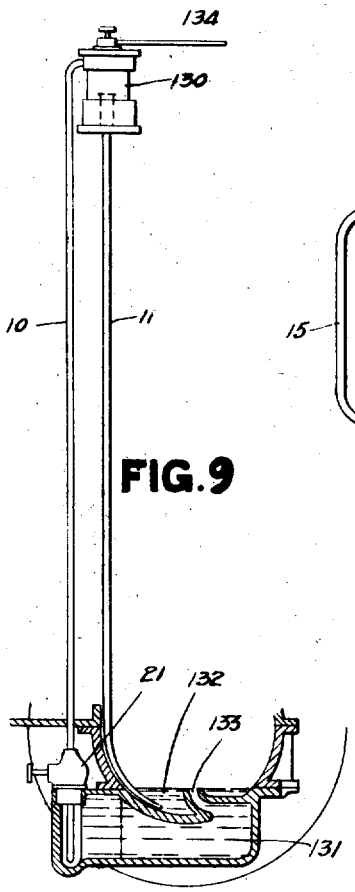
Figure 8:
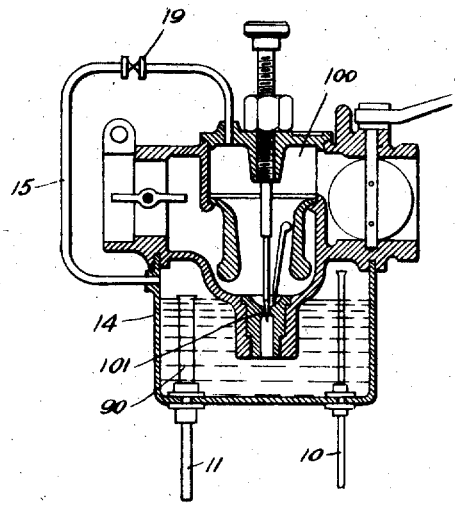

Fig. 6 is a semi-diagrammatic view showing the fitting of the apparatus to an automobile with an intermediate low level service tank, which is supplied with fuel from a main tank of relatively large capacity;

Fig. 7 illustrates an alternative detail of construction of this intermediate low level service tank;

Fig. 8 is a sectional view of a carbureter with the vacuum feed reservoir forming part of its structure;

Fig. 9 is a semi-diagrammatic view explanatory of the application of the invention to an engine lubricating system of the well known constant level splash type.

It will be understood that for any particular engine an appropriate proportion in the area of the pipes and vents may be determined so that with such engine the apparatus may operate entirely without valves; but in order to regulate standardized fittings to suit any one of a variety of engines, and to operate under different hydrostatic heads (determined by the height of the feed reservoir above the fuel tank), it is desirable to fit to such standardized apparatus certain manual controls to facilitate such regulation, but when these controls have been regulated for any particular engine, they may be fixed permanently.

In the drawings the same figures of reference indicate corresponding parts.

Referring to Figs. 1 to 8 of the drawings, which relate to gasolene or other fuel oil supply to an engine carbureter,—

Figure 3:
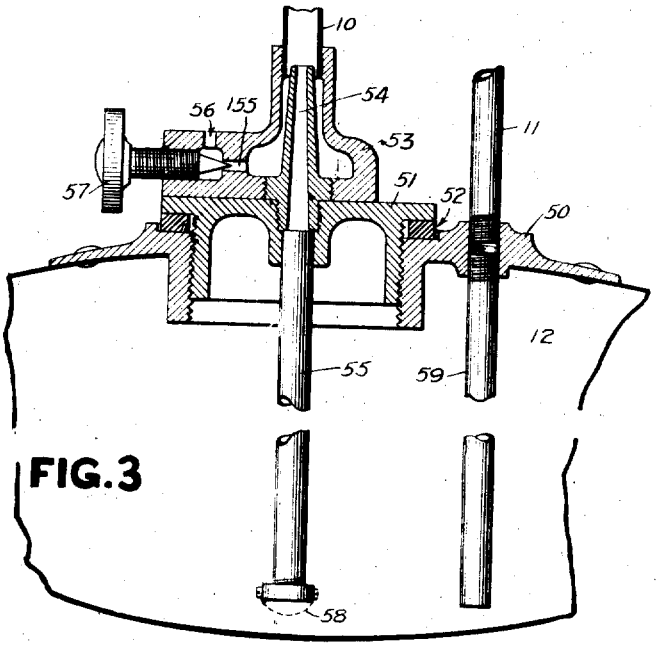
Fig. 3 is a detail sectional view of an air admission and control device in the ascension limb of the pipe loop which connects the low level tank with the high level feed reservoir.
Figure 4:
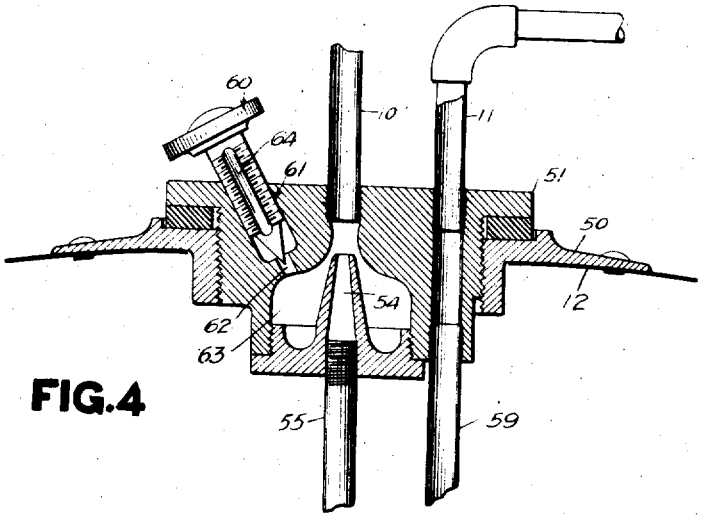
Fig. 4 is a sectional view through a low level tank showing an alternative construction, mechanically equivalent with the construction shown in Fig. 3, for the fitting of the two limbs of the pipe loop in the tank, and for admitting and controlling air supply to the ascension limb of said loop.

10 is the ascension limb and 11 is the return flow limb of the loop pipe circuit. These two limbs terminate at the foot in a low level tank 12, as shown in Figs. 1, 3, 4, and 5, but in the case of the arrangement shown in Figs. 6 and 7, terminate in the intermediate service tank 13. 14 is the high level feed reservoir, 15 the vacuum pipe from said reservoir 14 to the carbureter 121, 16 is the engine induction connection, 17 the chamber containing the float controlled fuel level valve usually associated with a carbureter, 18 fuel feed pipe from the reservoir 14 to the carbureter, and 22 a balance pipe between the pipe 15 and the top of the float chamber 17. 19 is a manual control valve in the vacuum pipe 15, and 20 are fuel stop valves, 21 are air admission fittings in the ascension limb of the fuel loop pipe. Details of these air admission fittings are shown in Figs. 3, 4, and 5.

Figure 1:
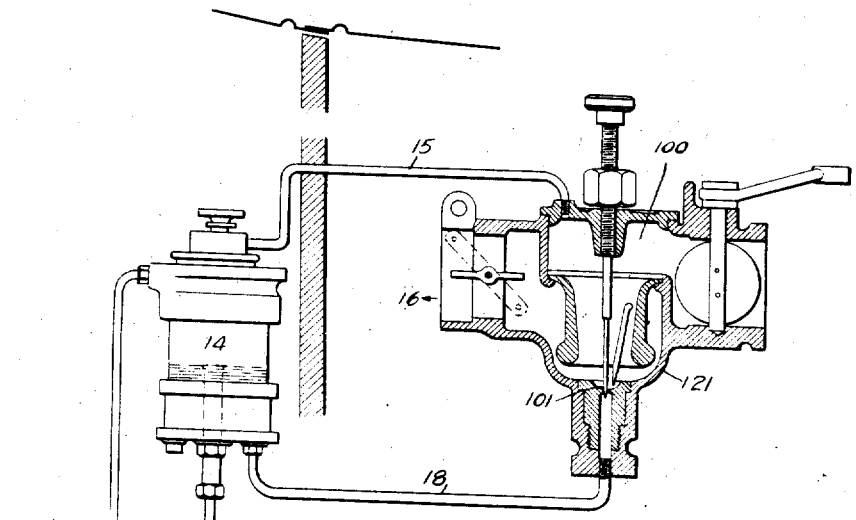

The carbureter 121 shown in Fig. 1 is a carbureter of known type with the usual float feed chamber omitted. It is to be understood that I am not restricted to the exercise of my invention in connection with this or any other particular construction of carbureter, notwithstanding that a particular construction is illustrated in the drawings for the purpose of explaining the invention.

It is desirable but not necessary that the air should be admitted into the ascension limb at a point above the level of the surface of the liquid fuel in the low level tank 12.

Referring particularly to Fig. 3, 50 is the neck collar of the low level tank 12, 51 is a cap screwed into said neck, and 52 is a loose packing washer which allows air to pass. The system is designed to operate with atmospheric pressure in the tank 12 but it will operate if a small pressure exists in the tank; such pressure must not however be high enough to force fuel out through the air admission vent. 53 is an air admission collar, into the upper end of which the ascension pipe 10 is screwed. A nozzle 54 on the end of the lift pipe 55, which in effect forms a lower extension of the ascension pipe 10, serves to deliver oil which is brought up through the pipe 55 into the limb 10. There is a clearance around the nozzle 54 through which air passes up into the pipe 10, with the fuel, this air being admitted through an aperture 155 leading to atmosphere, and a vent 56 which is controlled by a pin valve 57. The pin valve 57 is set to allow that quantity of air to pass in through the vent 155 which suffices to lighten the gravity of the column ascending in the pipe 10 and thereby disturb the hydrostatic balance which would otherwise exist between the columns in the pipes 10 and 11. The lower end of the pipe 55 is preferably covered with a gauze strainer 58, and located near the bottom of the tank 12 or in a sump so that fuel can be drawn when only a small quantity is contained in the tank. The return limb 11 of the pipe loop is brought into the tank 12 at any convenient place, and within said tank its extension 59 is fixed in a low position or in a sump so that the mouth of said pipe 59 will be always covered by fuel.

The alternative form of this fitting shown in Fig. 4 is mechanically equivalent, and as a matter of convenience the pipe 11 is brought into the reservoir 12 through the cap 51, and the nozzle 54 is fixed at a slightly lower position. The air control pin valve 60 works in a tapped hole 61 in the cap and controls the air admission vent 62 to the air collar 63 which surrounds the nozzle 54. One or more slots 64 cut in the side of the pin valve 60 serve to admit atmosphere therethrough to the air admission vent 62.

In order that the system may work with a minimum degree of vacuum and with a minimum volume of air admission to the ascension pipe, it is desirable that the nozzle 54 should be located no higher than is necessary above the highest level of the fuel contained in the reservoir 12. The construction shown in Fig. 4 brings the nozzle 54 a little lower than the construction shown in Fig. 3 and is therefore preferable.

It is however possible to operate the system when air is admitted near the foot of the ascension pipe, but in this case it is necessary to provide an automatic check valve in the return pipe 11.

The extension pipe 70 (Fig. 5) of the ascension pipe 10 is brought into a collar 71 having lateral ports 72 communicating with an annular space 73 contained between said pipe 70 and an inclosing pipe 74, and an oil nozzle 75 is fitted in the bottom of the pipe 74 so as to project upward into the contracted portion of the collar 71. 76 is a gauze screen. 77 is a pin valve corresponding with the pin valve 57, Fig. 3, controlling admission of atmosphere to the annular space 73. The foot of the return pipe 11 is fitted with a cage 80 forming a guide for a float ball valve 81 which is prevented from dropping out of said cage by a check pin 82, but by preference, the check valve 94 (see Fig. 5[a]) is fitted near the top of the tank 12.

The pipe 15 is connected into the head of the high level reservoir 14. A pin valve 84 is fitted to control the area of the vent 85. The ascension pipe 10 is connected into the upper part of the reservoir 14, but it may be brought in through the bottom of it. In the latter case undesirable turbulence of the fuel in the reservoir occurs. 87 is a baffle within said reservoir against which the air, the vapor mixture, and the inflowing fuel which pass in through the pipe connection 88 are mechanically separated, the liquid falling into the bottom of the reservoir, while the air and vapor pass up through the baffle 87 and thence through the vent 85 and pipe 15 to the engine induction system. The reservoir 14 is preferably constructed with a glass barrel 89 through which the flow of fuel into it and the level of the fuel contained in it may be observed. 90 is an overflow stand pipe; the height of the mouth of this pipe above the bottom of the reservoir determines the normal fuel level therein, (see Fig. 2). The foot of this stand pipe 90 is connected to the return pipe 11 leading to the low level fuel tank. The foot of the pipe 10 is connected into the air admission fitting (see Figs. 3, 4, and 5).

Figs. 6 and 7 are explanatory of a supplementary device which is intended to facilitate fitting of apparatus according to this invention on existing motor vehicles.

In this case the loop system, instead of connecting the low level tank 12 to the high level feed reservoir 14 connects an intermediate low level service tank 13 to said feed reservoir 14, the details of the loop being exactly the same as already described. The low level tank 12 is connected by a pipe 105 to the intermediate tank 13; a stop cock 20 may be fitted in this pipe. An automatic check valve 106 is provided to prevent liquid flowing back from the intermediate tank 13 to the main tank 12 but to admit liquid to flow in the contrary direction. The tank 13 is fitted in a convenient position in the locality of the engine and is always kept charged through the pipe 105. It will usually contain liquid above the hydrostatic level of the liquid in the tank 12 for the reason that in downhill running and in slowing up, liquid will pass forward to said tank 13 while under no circumstances can it pass backward. In the alternative arrangement shown in Fig. 7 the pipe 105 is brought into the forward side of the intermediate tank 13, near the top. The intermediate tank 13 is thus constituted a trap which is kept filled in the manner already described but is incapable of discharging its contents except through the ascension limb 10 of the pipe loop. 110 is a float raised check valve in the top of the tank 13 for the purpose of closing its atmosphere vent when the tank 13 is filled to overflowing.

Figures 5, 5A:
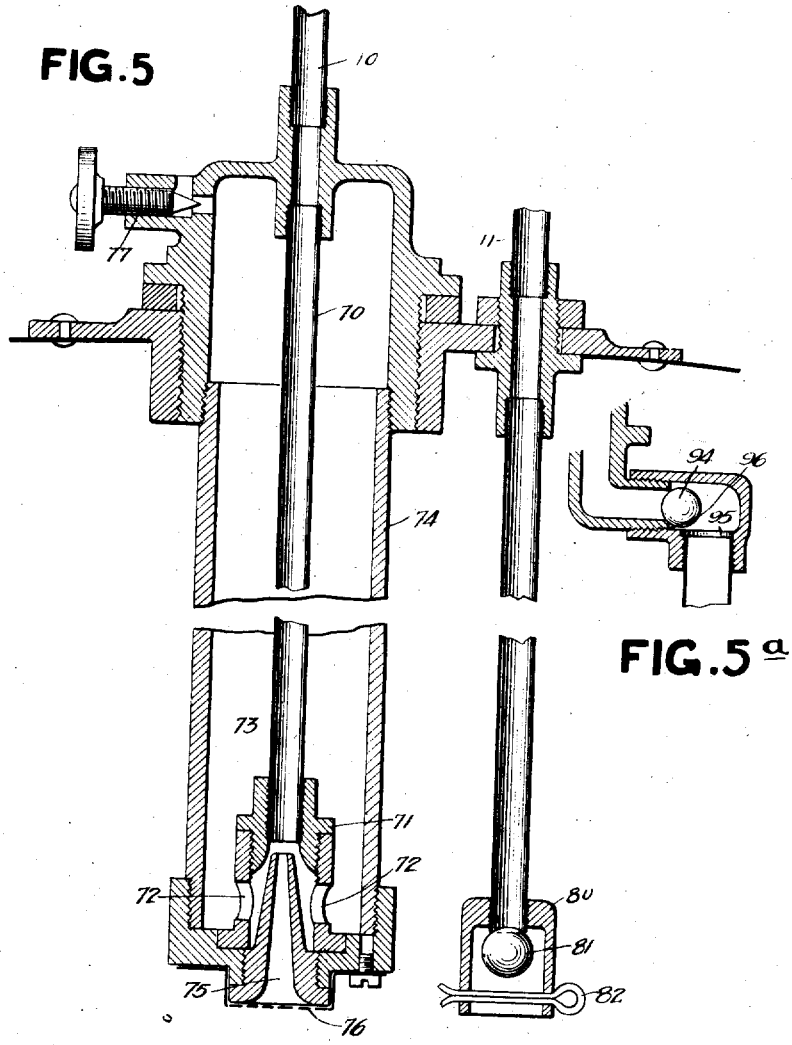
Fig. 5 is alternative to Fig. 4 and is a similar view in which air is admitted in a lower position into the ascension limb of the pipe loop, the arrangement shown in Fig. 4 being however considered preferable in use for reasons which will be hereinafter explained.

Referring to Fig. 5, it will be noted that while the system is not in operation, fuel will pass up through the nipple 75 and fill the annular chamber 73 to hydrostatic level; consequently air cannot pass into the pipe 70 leading to the ascension limb 10 until the fuel level in the annular chamber 73 has been lowered until the ports 72 are exposed. Under such circumstances if a check valve were not fitted in the return pipe 11, fuel would be drawn up bodily through both said pipes 10 and 11 and circulation might not be established. The provision of the check valve in this case closes the pipe 11 so that vacuum is effective only for drawing fuel up through the pipes 70 and 10. As soon as sufficient fuel has been drawn up so as to deplete the annular chamber 73, air admitted through the valve 77 will pass through the ports 72 into the pipes 70 and 10 and the operation is then the same as when the other constructions are used as elsewhere described. The check valve (81 or 94) comes to its seating only until the return flow is commenced through the pipe 11; thereafter there is a continuous circulation through the loop and the feed reservoir.

The fuel, according to its volatility, will suffer partial vaporization in its passage into the feed chamber 14, and the air which passes up with the fuel is more or less carbureted. The fuel value in this carbureted air and vapor will, however, be utilized, as all of it passes to the induction of the engine through the pipe 15.

The pipe 15 must be of sufficient bore to pass the maximum volume of air and fuel vapor which comes into the reservoir 14 through the ascension limb 10 of the loop, and the ascension pipe 10 must be of sufficient bore to carry fuel in excess of the maximum engine demand and also to carry therewith the quantum of air necessary to sufficiently disturb the static balance in the loop to procure continuous circulation therethrough. The return pipe 11 of the loop should be of sufficient bore to pass that quantity of liquid which is raised through the pipe 10 in excess of the minimum demand of the engine. In practice all these pipes would be of slightly larger bore than is essential to operative success.

Figure 2:
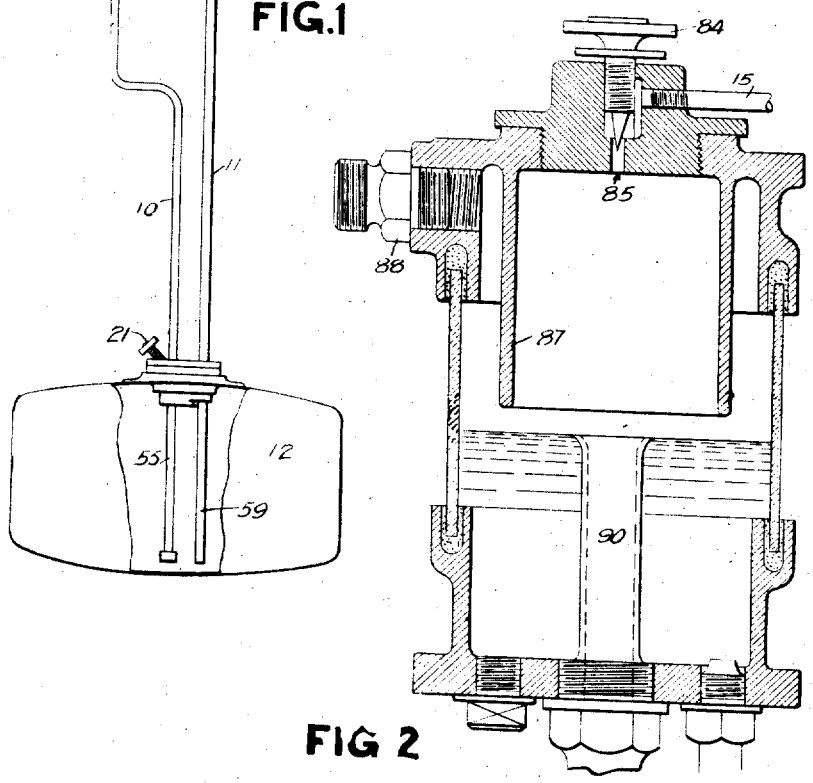
Fig. 2 is an enlarged vertical sectional view through the high level fuel feed reservoir.

Referring to Figs. 1, 2 and 4, the method of operation is as follows:—

When the engine is rotated to start it, partial vacuum is procured in the interior 100 of the carbureter in the region surrounding the nipple jet 101. A similar degree of vacuum is obtained in the high level feed reservoir 14 the top of which is in communication through the pipe 15 with the carbureter chamber 100. If under these circumstances the reservoir 14 is quite empty, fuel will be drawn up through both limbs 10 and 11 of the loop and at the same time air will be drawn into the limb 10 through the orifice 62. When the reservoir 14 has thus received a quantity of liquid fuel sufficient to cover the mouth of the overflow pipe 90, circulation through the loop commences, liquid fuel and air passing up through the ascension limb 10, and overplus of liquid returning through the limb 11. The diminished "head" in the limb 10 due to the presence of air among the liquid therein has the effect of disturbing the hydrostatic balance and insuring a continuous circulation up through the pipe 10 and (by gravity) down through the pipe 11, so long as suction is maintained through the pipe 15. The valve 60 is adjusted to admit just that quantity of air which suffices to maintain a sufficiently rapid circulation, and the valve 84 (or 19 Fig. 6) is adjusted to allow only a quantum of air and vapor to be drawn through the aperture 85 and pipe 15 which will suffice to insure the maintenance of this circulation. As the carbureter jet 101 is subject to approximately the same degree of vacuum as the interior of the feed reservoir 14, liquid may flow by gravity to static level through the pipe connection 18, and if the reservoir 14 is set so that the top of the overflow pipe therein is level with the mouth of the nozzle, fuel will stand in the nozzle always just at the mouth level therein. Consequently said liquid fuel may be entrained in and vaporized by the induction draft in the carbureter in the same manner as liquid fuel supplied to a carbureter through a float chamber.

Assuming the substitution of the fitting shown in Fig. 3 for that shown in Fig. 4, there is no difference in the operation.

When a float chamber is associated with a carbureter, the feed reservoir 14 is placed on the dash of a motor vehicle or at any position in the location of the engine to be supplied, sufficiently above the level of the float chamber to insure that fuel may always flow by gravity from the feed reservoir to the float chamber. This is indicated in Fig. 6, where also it is made clear that in this case the float chamber must be entirely closed to atmosphere except through its pipe connections, and that a balance pipe 22 must be fitted between the pipe 15 and the top of the float chamber. This balance pipe connection should be located rearward of the valve control 19 instead of being fitted in the top of the feed reservoir as shown in Fig. 2.

When a float chamber is not used fuel will flow by gravity through the carbureter nozzle 101 if the top of the overflow 90 in the reservoir 14 stands above the level of said nozzle mouth. Suitable means should be provided in this case to close the nozzle when the engine is stopped, for otherwise the fuel contained in the chamber 14 below the overflow level would be wasted, flowing into the carbureter and flooding it. And in this case also it is very desirable that the reservoir 14 shall be located as close as practicable to the carbureter and if not part of its structure, preferably in front of it when the system is fitted in a motor road vehicle, in order that the fuel supply may suffer minimum disturbance on account of variations in road grade and to insure maximum fuel supply to the nozzle when the vehicle is on an up grade.

As shown in Fig. 8 the feed reservoir 14 is part of the carbureter structure and the nozzle draws fuel directly out of the said reservoir.

Referring to Fig. 9 which illustrates a lubrication system, 130 is the feed reservoir; it corresponds in construction with the feed reservoir 14 shown in other figures, and the remaining figures of reference indicate the same operative parts as those similarly identified in other figures of the drawings. 131 is the oil sump and 132 is an oil tray into which the crank end dips. 133 is the overflow of the tray 132. The ascension pipe 10 is brought into the bottom of the sump 131 and the flow pipe 11 is brought into the pit of the tray 132 in order that it will always be covered with oil. The suction pipe 134 is independent of the suction pipe 15 in connection with a fuel feed system fitted to the same engine, and it is carried directly into the induction manifold or other part of the induction system where a suitable vacuum exists.

When the system is fitted to a two cycle engine the vacuum pipe of the feed reservoir is connected to the crank case or air supply cylinder or equivalent part and fitted with a non-return valve so that a vacuum condition is assured in the feed reservoir.

While I have herein shown and described with considerable particularity and in detail certain specific features of apparatus peculiarly adapted to the practice of my invention, it will be understood that various changes may be made in the form, arrangement, location, number and functioning of the parts without departing from the spirit of my invention. It will also be obvious that certain of the alternative forms as well as many of the details of construction herein shown are not specifically claimed herein, such subject matter having been reserved for other applications for Letters Patent filed or about to be filed by me.

What I claim as my invention and desire to secure by Letters Patent is:—

1. The combination of a low level oil tank, a high level oil feed reservoir, a vacuum connection from said reservoir adapted to be fitted to the induction system of an internal combustion engine, an ascension pipe and a down flow pipe connecting said reservoir and tank and forming an oil circulation loop, and means for admitting air into said ascension pipe.

2. The combination with a carbureter for an internal combustion engine, of a feed chamber therein which forms the head of a liquid fuel circulation loop terminating at the foot in a low level liquid fuel tank, a connection between the upper part of said chamber and a place in said carbureter where a condition of partial vacuum exists while the carbureter is passing fuel, and means for admitting air into the ascension pipe of said loop.

3. In combination with an internal combustion engine and a carbureter, apparatus for maintaining a constant flow of liquid fuel to a high level feed reservoir from a low level tank, embodying a liquid circulation loop connecting into the reservoir and including at its upper end the said feed tank, the feed reservoir being connected to the carbureter to supply fuel thereto, means for admitting air into one side of the circulation loop to lighten the column of liquid therein, and means to apply the engine suction to the reservoir to draw air into the loop to lift the lightened column and to draw said air out of the feed reservoir into the engine.

4. In a vacuum operated apparatus for raising liquid fuel from a low level tank to a high level feed reservoir and thence serving an engine carbureter with said fuel, a pipe loop connecting said reservoir and tank, means for introducing air into one limb of said pipe, a fuel feed connection from said feed reservoir to said carbureter, and a vacuum connection from the upper part of said reservoir to the induction system of the engine.

5. In a liquid fuel lift apparatus operated by vacuum, a low level fuel tank, a high level feed reservoir, a fuel ascension pipe having its lower end located in the fuel tank and its upper end leading into the feed reservoir, air admission means into the ascension pipe below the feed tank, means for withdrawing air from the reservoir, means for delivering fuel therefrom, and a return pipe adapted to carry overplus fuel by gravity from the reservoir to the tank.

6. In a vacuum operated system for raising liquid fuel from a low level tank to a high level feed reservoir associated with the carbureter of an internal combustion engine, the combination of a fuel ascension pipe adapted to connect said tank and reservoir and having in its lower part an air admission vent, a pipe adapted to connect the upper part of said reservoir with the induction of the engine, an overflow from said reservoir adapted to be connected by a return flow pipe to said tank, and a pipe adapted to connect the lower part of said reservoir with the carbureter fuel intake.

7. In apparatus adapted to be fitted to a read vehicle for raising liquid fuel by vacuum from a low level tank to a high level reservoir and returning surplus of said fuel by gravity, the combination of a low level bulk tank, an intermediate low level service tank, a pipe connection from the bottom of said bulk tank to said service tank, means for preventing return of fuel through said pipe while permitting fuel to flow therethrough into said service tank, a pipe loop including a high level feed reservoir and having its ends in said service tank, means for admitting air into one of said pipes intermediate said service tank and said reservoir, and means comprising a connection to an engine induction service for exhausting air from said reservoir.

8. The combination with an internal combustion engine, of a carbureter having a float level chamber closed to atmosphere, a low level liquid fuel tank, a high level fuel feed reservoir having an overflow pipe to the lower part of said tank, an ascension pipe from the lower part of said tank to said reservoir, a valved air admission vent in said ascension pipe located close above the fuel level in said tank, a pipe connection from the upper part of said reservoir to the engine intake, a fuel feed pipe from the lower part of said reservoir to the carbureter fuel intake, a vacuum equalizing pipe connecting the upper part of said reservoir to the upper part of the carbureter float level chamber, and a baffle in said reservoir adapted to separate liquid fuel from air and vapor.

9. In combination with a carbureter, a low level liquid fuel tank, a liquid fuel reservoir above said tank and in communication with the carbureter to supply it with fuel, communication between the tank and reservoir, means for restrictedly admittting atmosphere to said communication at a point where the admitted atmosphere enters the upwardly moving column of liquid moving from the tank to the reservoir, and communication means to apply to said liquid fuel reservoir the suction which is applied to the carbureter to create a partial vacuum in the reservoir and to draw therefrom the air which enters it with the fuel.

10. In combination with a carbureter, a low level liquid fuel tank, a liquid fuel reservoir above said reservoir and in communication with the carbureter to supply it with fuel, communication between the tank and reservoir, means for restrictedly admitting atmosphere to said communication at a point where the admitted atmosphere enters the upwardly moving column of liquid moving from the tank to the reservoir, communication means to apply to said liquid fuel reservoir the suction which is applied to the carbureter to create a partial vacuum in the reservoir and to draw from the tank the air which enters it with the fuel, and overflow means in the reservoir with connection to the tank for returning surplus fuel from the reservoir to the tank.

11. In combination with a carbureter having a liquid fuel chamber, a low level liquid fuel tank, a liquid fuel reservoir above said reservoir and in communication with the carbureter to supply it with fuel, an ascension communication between the tank and reservoir, an overflow communication between the reservoir and tank to carry back to the tank any surplus fuel, means for restrictedly admitting atmosphere to the ascension communication at a point where the admitted air enters the upwardly moving column of liquid, communication means to continuously apply to the reservoir the same suction that is applied to the carbureter to create a partial vacuum in the reservoir and to draw from the tank the air which enters it with the fuel, and means to equalize the pressure on the fuel in the carbureter chamber with the pressure on the fuel in the reservoir.

12. In combination with a carbureter, a low level liquid fuel tank, a liquid fuel reservoir above the tank and in communication with the carbureter to supply it with fuel, a communication between the tank and reservoir, means for restrictedly admitting atmosphere to said communication at a point where the admitted atmosphere passes with the upwardly moving column of liquid fuel moving from the tank to the reservoir, and means to controllably apply to said reservoir the suction which is applied to the carbureter to maintain a partial vacuum in the reservoir and to draw therefrom the air which enters it with the fuel.

13. In a liquid feed system for an internal combustion engine, the combination of a liquid tank, a liquid reservoir above said tank, communication between the tank and the reservoir, means for admitting atmosphere to said communication at a point to enter the column of liquid moving upwardly through said communication, means for applying suction to the upper part of the reservoir said means carrying the admitted atmosphere to mix with the carbureted charge of the engine, and means for cutting off suction to the reservoir.

14. The herein described method of lifting and supplying fuel to an internal combustion engine, consisting in raising a liquid fuel by application of the engine suction thereto, lightening the rising fuel by admitting to and mixing therewith a limited amount of air, drawing said air into the engine intake, forming of said lifted fuel a carbureted mixture with air, and drawing said carbureted mixture into the engine intake along with the first mentioned air.

15. The herein described method of lifting and supplying fuel to an internal combustion engine, consisting in raising a liquid fuel by intermittent application of the engine suction thereto, lightening the rising fuel by admitting to the same a restricted quantity of air and thereby carbureting the air, said carbureted air being drawn into the engine by its suction, forming a carbureted mixture of air and the lifted fuel, and drawing said carbureted mixture into the engine along with the first mentioned carbureted air.

16. The herein described method of lifting and supplying fuel to an internal combustion engine, consisting in raising a liquid fuel by application of the engine suction thereto, lightening the rising fuel by restrictedly admitting air to the fuel being lifted and thereby carbureting said air, said carbureted air being drawn by the engine suction into the engine, and forming a carbureted mixture of air and the lifted fuel and drawing said carbureted mixture into the engine along with the first mentioned air.

17. The herein described method of lifting and supplying fuel to an internal combustion engine, consisting in raising a liquid fuel by application of engine suction thereto, lightening the rising fuel by admitting to and mixing therewith a limited amount of air at a low level point, separating the surplus raised liquid from said air, drawing said air into the engine intake, forming of said lifted fuel a main carbureted mixture with other air, and drawing said carbureted mixture into the engine intake along with the first mentioned air.

18. The herein described method of lifting and supplying fuel to an internal combustion engine, consisting in raising a liquid fuel from a low level tank to a higher level chamber by the application of engine suction to said liquid, lightening the rising fuel by restrictedly admitting air to the fuel being lifted adjacent to the lower end of the rising column and thereby vaporizing a portion of said liquid, separating the unvaporized portion of said liquid in said chamber, forming a carbureted mixture of said separated liquid, and drawing said carbureted mixture and said first mentioned air into the engine.

19. The herein described method of lifting and supplying fuel to an internal combustion engine, consisting in raising a liquid fuel from a low level tank to a higher level chamber by the application of engine suction thereto, lightening the rising fuel by admitting thereto and mixing therewith a limited amount of air at a point near the lower end of the rising fuel, withdrawing the raised liquid from said chamber, forming a carbureted mixture from said liquid and air, and drawing both said carbureted mixture and said first mentioned air into the engine.

20. The herein described method of lifting and supplying fuel to an internal combustion engine, consisting in raising a liquid fuel from a low level tank to a higher level chamber by the application of engine suction thereto, lightening the rising fuel by admitting thereto and mixing therewith a limited amount of air at a point near the lower end of the rising fuel, separating by gravity said air and unvaporized portion of said liquid in said chamber, withdrawing the raised liquid from said chamber and forming a carbureted mixture from said liquid and air, and drawing both said carbureted mixture and said first mentioned air into the engine.

21. In combination, a low level liquid fuel tank, a higher level chamber, communication between the tank and chamber, means for restrictedly admitting atmosphere to said communication at a point where the admitted atmosphere enters the upwardly moving column of liquid moving from the tank to the chamber, communication means to apply to said chamber engine intake suction to create a partial vacuum in the chamber and to draw from the chamber the air which enters it with the rising column of fuel, and means operated by engine intake suction for withdrawing from said chamber liquid separating from the air therein and forming the main carbureted mixture to be supplied to the engine.

22. The combination with a carbureter, a low level liquid fuel tank, a chamber above the tank and in communication with the carbureter to supply it with fuel, a pipe connecting the tank and chamber and having means for restrictedly admitting atmosphere thereto at a point adjacent to said tank whereby the admitted atmosphere passes with the upwardly moving column of liquid fuel moving from the tank to the chamber, and means for applying to said chamber the suction which is applied to the carbureter to maintain a partial vacuum in said chamber and to draw therefrom the air which enters it with the fuel and from which the surplus liquid has been separated by gravity in said chamber.

23. In an apparatus adapted to be fitted to a road vehicle, for raising liquid fuel by vacuum from a low level tank to a higher level chamber, the combination of a low level bulk tank, an intermediate low level service tank, a pipe connection from said bulk tank to said service tank, means for preventing return of fuel through said pipe while permitting fuel to flow therethrough into said service tank by gravity, a pipe connecting said chamber and said service tank, and a connection from said chamber to an engine induction service for exhausting air from said chamber and lifting liquid to the latter.

24. In an apparatus adapted to be fitted to a road vehicle for raising liquid fuel by vacuum from a low level tank to a higher level chamber, the combination of a low level bulk tank, an intermediate low level service tank, a pipe connection from the bottom of said bulk tank to said service tank, means for preventing return of fuel through said pipe while permitting fuel to flow therethrough into said service tank, a pipe connecting said chamber and said service tank and having means for restrictedly admitting air thereto adjacent to said service tank, a connection from said chamber to an engine induction service for exhausting air from said chamber, and a carbureter receiving air from the atmosphere and liquid from said chamber.

Signed at New York city in the county of New York, and State of New York, this 3d day of June, A. D. 1919.

CHARLES LAWRENCE STOKES.